United States Patent
Lahey et al.

(10) Patent No.: US 8,312,946 B2
(45) Date of Patent: Nov. 20, 2012

(54) TRIGGER CONTROLLER

(75) Inventors: Clint Lahey, Mount Pleasant, SC (US); Matthew Lambert, Summerville, SC (US)

(73) Assignee: Husqvarna Consumer Outdoor Products N.A., Inc., Augusta, GA (US)

( * ) Notice: Subject to any disclaimer, the term of this patent is extended or adjusted under 35 U.S.C. 154(b) by 620 days.

(21) Appl. No.: 12/496,727

(22) Filed: Jul. 2, 2009

(65) Prior Publication Data

US 2011/0000176 A1    Jan. 6, 2011

(51) Int. Cl.
*B62D 51/04*    (2006.01)

(52) U.S. Cl. ........ 180/19.3; 180/19.1; 180/324; 56/10.8

(58) Field of Classification Search ............... 56/10.8, 56/11.3; 180/19.1, 19.3, 324, 315
See application file for complete search history.

(56) References Cited

U.S. PATENT DOCUMENTS

| | | | |
|---|---|---|---|
| 1,387,578 A * | 8/1921 | Yost ............................. | 56/10.5 |
| 2,689,620 A | 9/1954 | Hainke | |
| 2,860,473 A * | 11/1958 | Wehner ......................... | 56/11.1 |
| 2,960,886 A * | 11/1960 | Cunningham ................ | 74/488 |
| 3,230,695 A * | 1/1966 | West ............................. | 56/10.5 |
| 3,529,482 A | 9/1970 | Jackson et al. | |
| 4,117,652 A | 10/1978 | Jones et al. | |
| 4,152,881 A * | 5/1979 | Hoff .............................. | 56/11.3 |
| 4,230,200 A * | 10/1980 | Carolan ......................... | 180/272 |
| 4,335,566 A * | 6/1982 | Hurd ............................. | 56/11.8 |
| 4,738,084 A | 4/1988 | Ogano et al. | |
| 5,297,379 A | 3/1994 | Smith | |
| 5,343,678 A * | 9/1994 | Stuart ........................... | 56/11.3 |
| 5,375,674 A | 12/1994 | Peter | |
| 5,377,774 A | 1/1995 | Lohr | |
| 5,488,818 A | 2/1996 | Powers et al. | |
| 5,511,367 A | 4/1996 | Powers et al. | |
| 6,082,083 A | 7/2000 | Stalpes et al. | |
| RE37,728 E | 6/2002 | Kamm | |
| 6,796,392 B2 | 9/2004 | Kobayashi et al. | |
| 6,945,133 B2 * | 9/2005 | Rush et al. ................... | 74/501.5 R |
| 6,951,092 B2 * | 10/2005 | Busboom et al. ............. | 56/10.8 |
| 7,178,322 B2 | 2/2007 | Osborne | |
| 7,263,818 B2 | 9/2007 | Osborne | |
| 7,275,615 B2 | 10/2007 | Derby et al. | |
| 7,293,397 B2 | 11/2007 | Osborne | |
| 7,318,309 B2 | 1/2008 | Osborne | |
| 7,698,881 B2 * | 4/2010 | McCane et al. ............... | 56/10.8 |
| 2006/0211540 A1 * | 9/2006 | Moriyama et al. ............. | 477/166 |
| 2007/0169743 A1 | 7/2007 | Kobayashi et al. | |
| 2007/0273152 A1 | 11/2007 | Kawakami et al. | |
| 2007/0275821 A1 | 11/2007 | Kawakami et al. | |

* cited by examiner

*Primary Examiner* — Tashiana Adams
*Assistant Examiner* — Maurice Williams
(74) *Attorney, Agent, or Firm* — Nelson Mullins Riley & Scarborough LLP

(57) ABSTRACT

A trigger 52*a* control apparatus is provided for operating a transmission 44 of a self-propelled mowing machine 20 via a cable 42 between a halt condition and an advancement condition. The trigger 52*a* control apparatus includes a housing 100, and a plurality of independently operable triggers 52*a* rotatably coupled to the housing 100 for movement between an engaged and a disengaged position 104. Each trigger 52*a* includes an operation member 108*a*. A cam 114 is rotatably coupled to the housing 100 about a cam rotation axis 116 and operatively coupled to the cable 42, wherein rotation of the cam 114 in a first direction relatively increases tension in the cable 42. An actuation member 138 is coupled to the cam 114 a distance from the cam rotation axis 116. Movement of at least one of the plurality of triggers 52*a* towards the engaged position 102 causes a respective operation member 108*a* to engage the actuation member 138 to rotate the cam 114 in the first direction, whereby the transmission 44 is operated in the advancement condition.

24 Claims, 12 Drawing Sheets

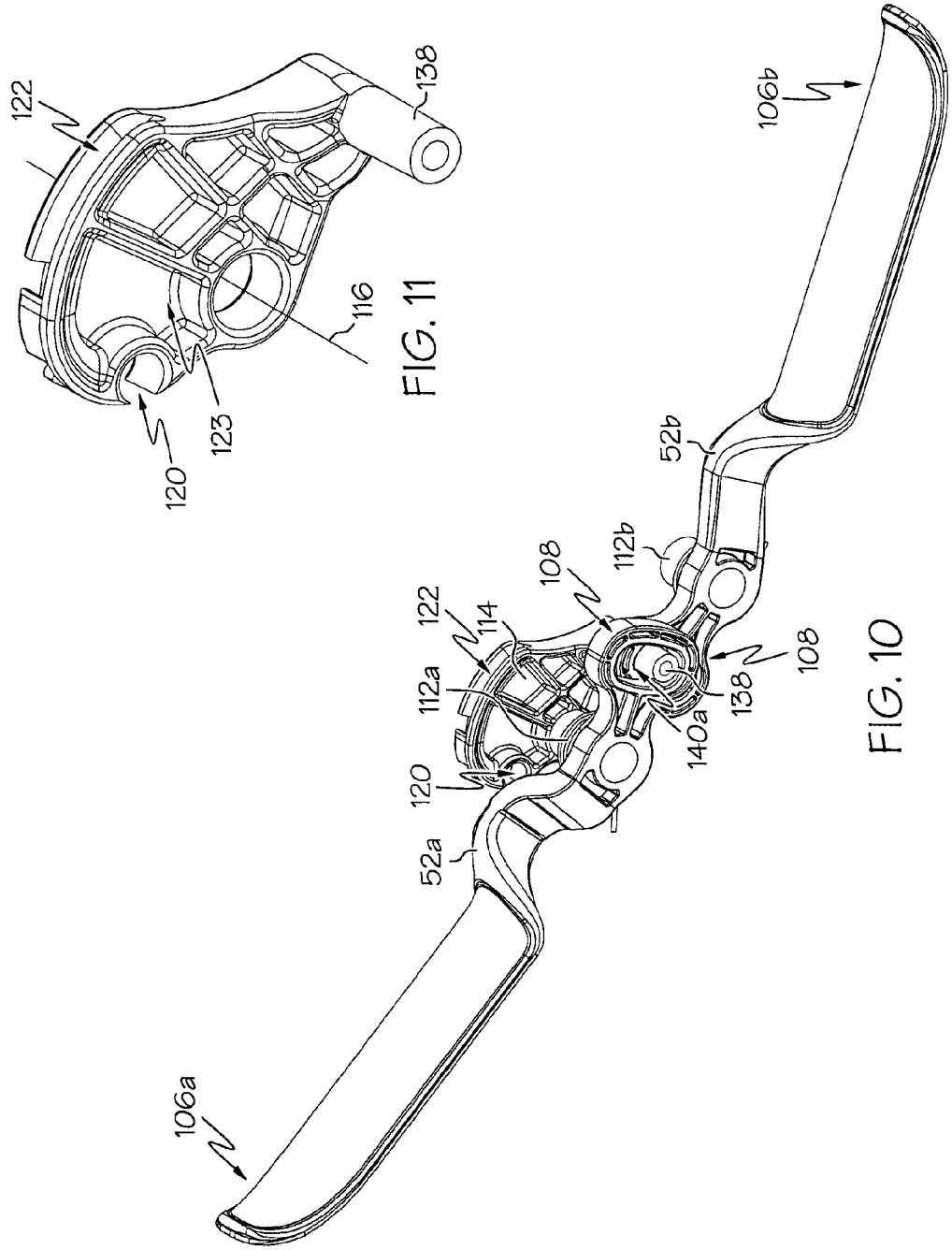

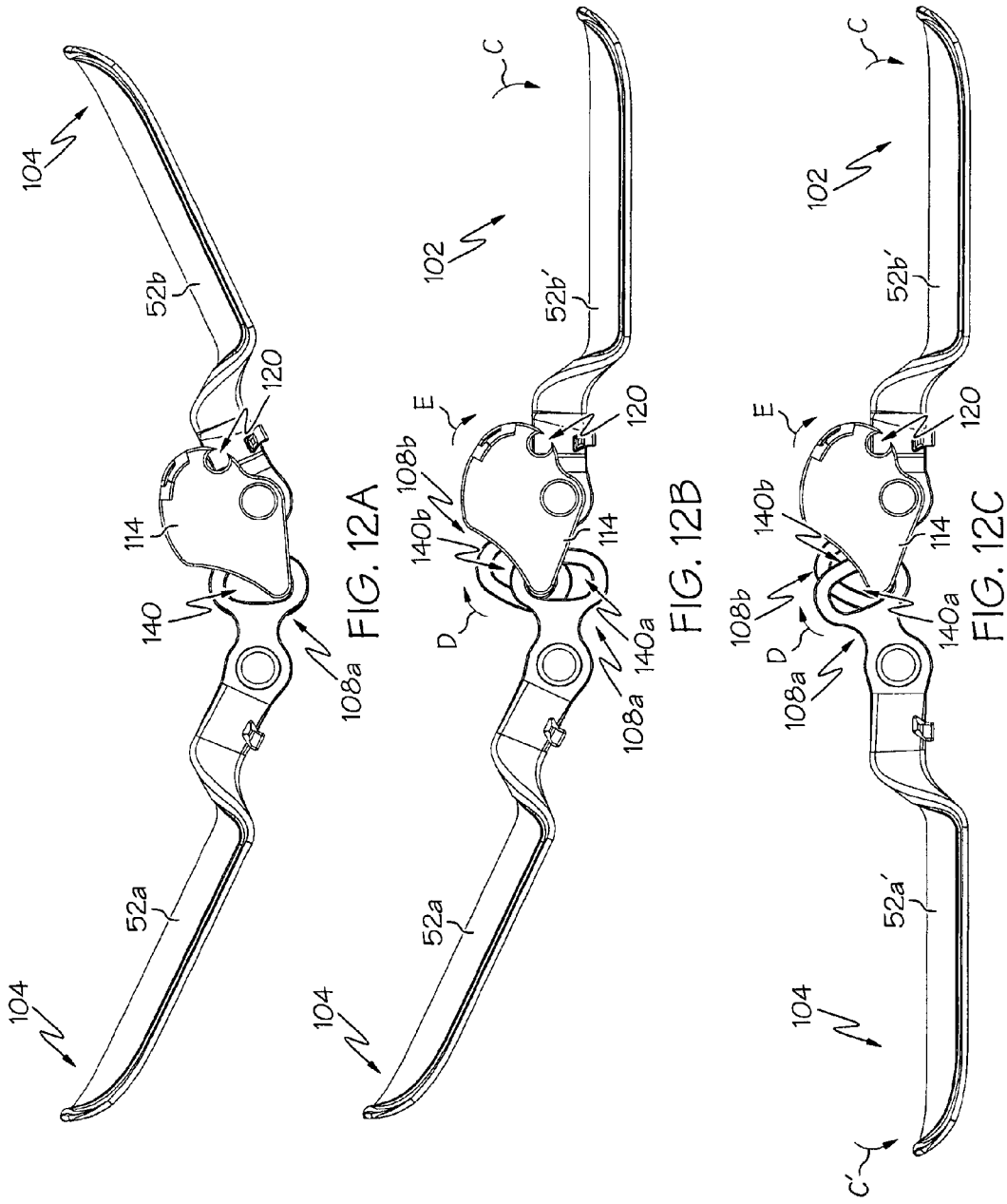

TRIGGER CONTROLLER

CROSS-REFERENCE TO RELATED APPLICATIONS

Not Applicable

FIELD OF THE INVENTION

The subject application relates generally to lawn mowers, and more particularly, to lawn mowers that include a drive control for controlling a transmission of a self-propelled lawn mower.

BACKGROUND OF THE INVENTION

Self-propelled machines, such as lawn mowers and the like, are well-known. Self-propelled lawn mowers generally include a transmission interposed between the mower's power unit (e.g., engine or motor) and one or more driving wheels. In particular, a "walk behind" lawn mower can be self-propelled such that the operator walks behind the machine during movement of the mower in a forward direction.

It is also well-known to provide a self-propelled lawn mower with a controller for operating the transmission between a halt condition and an advancement condition. However, the lawn mower may be operated by various individuals having different preferences for operating the controller with either, or even both, or their left and right hands. Thus, there is a continuing need for an improved control system for a self-propelled machine.

BRIEF SUMMARY OF THE INVENTION

The following presents a simplified summary of the invention of the subject application in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the subject application, a self-propelled mowing machine is provided, including a chassis, a power unit, a handle coupled to the chassis including a grip portion, a driving wheel rotatably coupled to the chassis, and a transmission for propelling the mowing machine, interposed between the power unit and the driving wheel. A cable has a first end and a second end with the first end being coupled to the transmission, whereby operation of the transmission is controlled via the cable. A trigger control system is coupled to the handle adjacent the grip portion for operating the transmission between a halt condition and an advancement condition. The trigger control system includes a housing, and a plurality of independently operable triggers rotatably coupled to the housing for movement between an engaged position and a disengaged position, with each trigger including an operation member. A cam is rotatably coupled to the housing about a cam rotation axis and operatively coupled to the second end of the cable, wherein rotation of the cam in a first direction about the cam rotation axis relatively increases tension in the cable. An actuation member is coupled to the cam a distance from the cam rotation axis. Movement of at least one of the plurality of triggers towards the engaged position causes a respective operation member of said trigger to engage the actuation member to rotate the cam in the first direction, whereby the transmission is operated in the advancement condition.

In accordance with another aspect of the subject application, a self-propelled mowing machine is provided, including a chassis, a power unit, a handle coupled to the chassis including a grip portion, a driving wheel rotatably coupled to the chassis, and a transmission for propelling the mowing machine, interposed between the power unit and the driving wheel. A cable has a first end and a second end with the first end being coupled to the transmission, whereby operation of the transmission is controlled via the cable. A trigger control system is coupled to the handle adjacent the grip portion for operating the transmission between a halt condition and an advancement condition. The trigger control system includes a housing, a plurality of triggers rotatably coupled to the housing for movement between an engaged position and a disengaged position, with a first trigger of the plurality of triggers including an operation member. A cam is rotatably coupled to the housing about a cam rotation axis and operatively coupled to the second end of the cable, wherein rotation of the cam in a first direction about the cam rotation axis relatively adjust a relative position of the cable. An actuation member is coupled to the cam a distance from the cam rotation axis. Movement of the first trigger towards the engaged position causes a respective operation member of said first trigger to engage the actuation member to rotate the cam in the first direction, whereby the transmission is operated in the advancement condition.

In accordance with another aspect of the subject application, a trigger control apparatus is provided for operating a transmission of a self-propelled mowing machine via a cable between a halt condition and an advancement condition. The trigger control apparatus includes a housing, and a plurality of independently operable triggers rotatably coupled to the housing for movement between an engaged position and a disengaged position. Each trigger includes an operation member. A cam is rotatably coupled to the housing about a cam rotation axis and operatively coupled to the cable, wherein rotation of the cam in a first direction about the cam rotation axis relatively increases tension in the cable. An actuation member is coupled to the cam a distance from the cam rotation axis. Movement of at least one of the plurality of triggers towards the engaged position causes a respective operation member of said trigger to engage the actuation member to rotate the cam in the first direction, whereby the transmission is operated in the advancement condition.

In accordance with still another aspect of the subject application, a trigger control system is coupled to the handle adjacent the grip portion for operating a transmission of a self-propelled mowing machine via a cable between a halt condition and an advancement condition. The trigger control system includes a housing, a plurality of triggers rotatably coupled to the housing for movement between an engaged position and a disengaged position, with a first trigger of the plurality of triggers including an operation member. A cam is rotatably coupled to the housing about a cam rotation axis and operatively coupled to the second end of the cable, wherein rotation of the cam in a first direction about the cam rotation axis relatively adjust a relative position of the cable. An actuation member is coupled to the cam a distance from the cam rotation axis. Movement of the first trigger towards the engaged position causes a respective operation member of said first trigger to engage the actuation member to rotate the cam in the first direction, whereby the transmission is operated in the advancement condition.

BRIEF DESCRIPTION OF THE DRAWINGS

The foregoing and other aspects of the subject application will become apparent to those skilled in the art to which the subject application relates upon reading the following description with reference to the accompanying drawings, in which:

FIG. 10 illustrates a reverse perspective view of the operational trigger of FIG. 8 with the housing and other components removed for clarity;

FIG. 11 illustrates an example cam for use with the operational trigger of FIG. 8;

FIG. 12A illustrates a front view of the operational trigger of FIG. 8 with both triggers in a disengaged position;

FIG. 12B is similar to FIG. 12A, but shows one of the triggers in an engaged position;

FIG. 12C is similar to FIG. 12A, but shows both of the triggers in an engaged position.

DESCRIPTION OF EXAMPLE EMBODIMENTS

Figure 1:
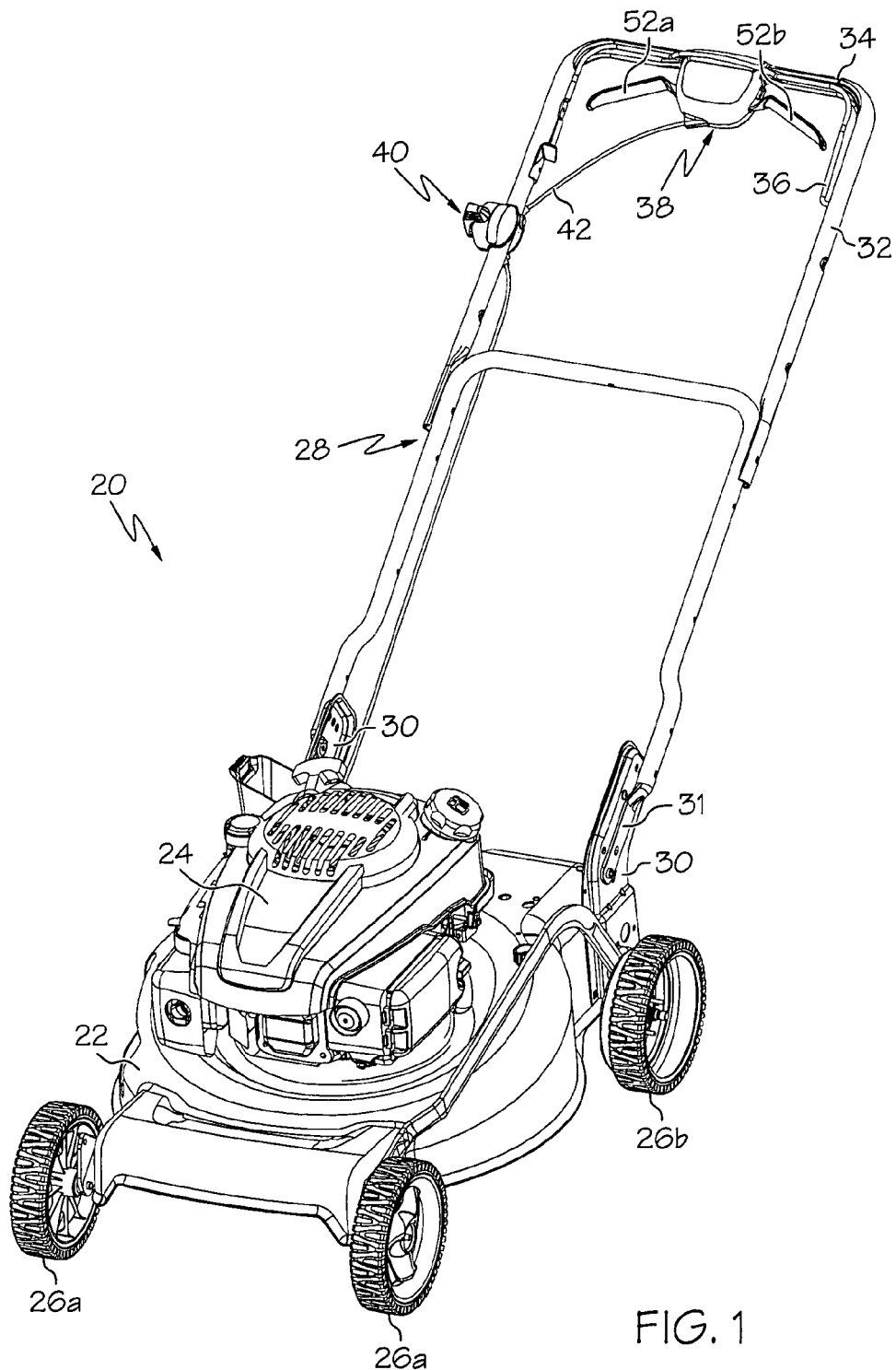
FIG. 1 illustrates a perspective view of a lawn mower that includes example aspects of the subject application.

Example embodiments that incorporate one or more aspects of the present invention of the subject application are described and illustrated in the drawings. These illustrated examples are not intended to be a limitation on the subject application. For example, one or more aspects of the subject application can be utilized in other embodiments and even other types of devices. Moreover, certain terminology is used herein for convenience only and is not to be taken as a limitation on the subject application. Still further, in the drawings, the same reference numerals are employed for designating the same elements.

Turning to the shown example of FIG. 1, an example self-propelled, walk behind lawn mower 20 is shown in accordance with example aspects of the subject application. The lawn mower 20 includes a chassis 22, such as a cutting deck, onto which a power unit 24 is mounted. As can be appreciated, the power unit 24 powers one or more blades (not shown) that are located within the chassis for cutting grass and/or other vegetation. The power unit 24 may be of various configurations such as electric, gasoline powered, and/or other. Also, the one or more blades may have various configurations. Still further, the chassis 22 may have various configurations and features. However, the chassis 22 is generally supported by a plurality of ground engaging wheels 26a, 26b. These wheels may be fairly movable or may be powered via a direct or indirect drive connection to the power unit 24. For example, as shown, the front pair of wheels 26a are non-powered, while either or both of the rear pair of wheels 26b can be powered (i.e., driving wheels).

In general, the chassis 22, power unit 24, and/or cutting blades may have various additional structures and features that are not shown herein. For example, the chassis 22 can include various discharge openings for cut grass. In the shown example, the chassis 22 can include a rearwardly directed discharge for cut grass. The orientation of rearwardly is with respect to the normal election that the walk behind mower 20 moves during the cutting operation. It should be appreciated that the discharge may have a variety of configurations shapes, placements etc. on the rear side (or even at other locations) of the chassis 22.

Also located at the rear side of the chassis 22 is at least one handle 28 that is coupled to the chassis 22. In the shown example, there are two supports 30 being located respectively on the left and right sides of the chassis 22 that may have any of various constructions and configurations. In the shown example, each support 30 is a generally plate-like structure which may have one or more reinforcement segments provided via bending or contouring of the material. In general, the material is typically metal. However, different materials such as plastic composite may be utilized. A plurality of mounting holes, apertures, studs or the like are located on each support 30. These holes and studs on one portion provide a means to connect the handle 28 to the chassis 22. In the shown example, an end 31 of the handle 28 is pivotally and adjustably coupled to the supports 30.

Generally, the handle 28 extends generally upwardly and rearwardly away from the chassis 22. The operator handle 28 may have any of several configurations and constructions. In general, the operator handle 28 extends upwardly in a general U-shape. The U-shape may be bifurcated to permit folding of the handle for storage. An upper portion 32 of the handle 28 is located at a generally ergonomic location and can include a grip portion 34 to be held or gripped by an operator who is located in an operator location directly behind the walk behind mower 20. The grip portion 34 can include various surface treatments and/or additional grip members, such as a plastic or rubber grip overlay or the like. One or more operation components may be mounted upon the handle 28 for operation of the mower 20 by the operator. For example, the operation components can include any or all of a throttle, a choke, an operational trigger 38 (as will be discussed more fully herein), a variable speed control 40 (as will be discussed more fully herein), and the like.

In addition or alternatively, an operator presence bail 36 or a blade brake clutch control can also be located on the handle 28 adjacent to an upper portion thereof (e.g., adjacent the grip portion 34). The operator presence structure can be pivotally mounted to the upper portion of the handle 28 such that the operator moves the bail 36 or control to an operation position when the operator is at the operator location and intends to operate the walk behind mower for cutting grass. In the shown example, the operator presence bail 36 is a movably mounted U-shaped member that is connected to the handle 28 via a movable mount, and can be resiliently biased towards a disengaged position. Specifically, the movable mount is a pivot mount such that the bail 36 can pivot back and be located against the upper portion of the handle 28, though the bail 36 or blade brake clutch can also have various other constructions and/or mounts. It is to be noted that FIG. 1 shows the operator presence bail 36 in the engaged position (i.e., located against/adjacent to the grip portion 34 of the handle 28). The operator presence bail 36 can be connected, via a cable or the like (not shown), to one or more components of the mower 20 that concern operation of the mower. As a safety feature, if the operator releases the bail 36, the power unit 24 and/or the mower blade can be configured to stop. For example, a blade brake, and/or clutch mechanism may be provided such that the blade is only operated when the operator presence bail is actuated and in the engaged position as shown in FIG. 1. However, it is to be understood that the structure may be different from the shown example.

Figure 2:
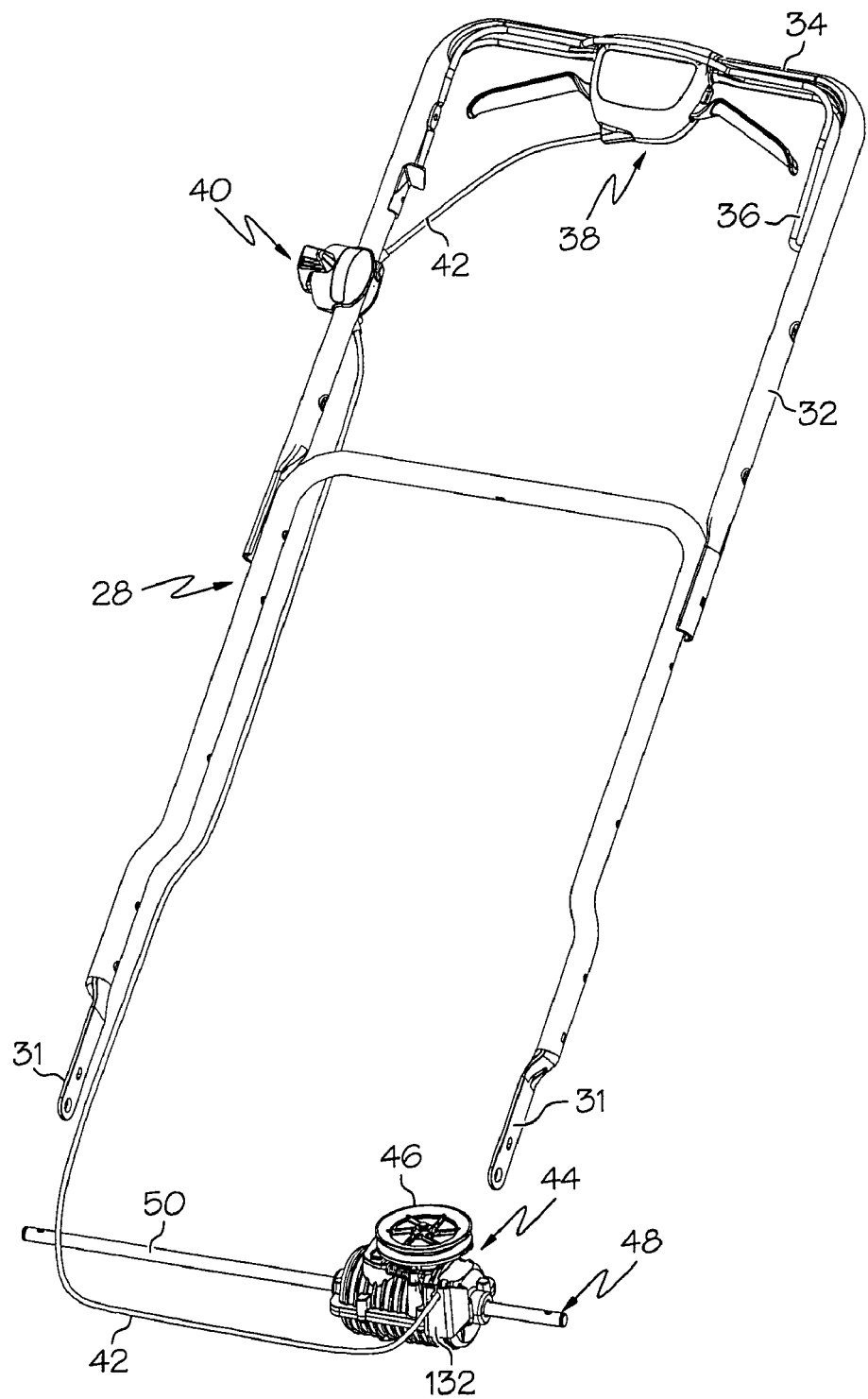
FIG. 2 is similar to FIG. 1, but the chassis, power unit, and driving wheels have been removed for clarity.

Turning now to FIG. 2, the self-propelled lawn mower 20 generally includes a transmission 44 interposed between the power unit 24 and one or more driving wheels 26b for propelling the mower 20. It is to be understood that various components of the lawn mower 20 have been removed for clarity. For example, the chassis 22, power unit 24, and driving wheels 26a, 26b are not illustrated.

The transmission 44 can be a single speed transmission, such as a non-adjustable transmission. Alternatively, as shown, can be a variable speed transmission 44. The variable speed transmission 44 can include various types of transmissions, such as a geared transmission, a belt-operated transmission, a hydraulically-operated transmission, etc. Moreover, the variable speed transmission 44 can have a plurality of discrete speeds (i.e., a plurality of fixed gear ratios), and/or can be continuously variable within a range of speeds (i.e., steplessly or continuously vary the gear ratio). The power unit 24 can supply operational power to the transmission 44 in various direct or indirect manners. For example, as shown, power can be supplied via a belt-driven pulley system having a driven pulley 46 coupled to the transmission 44, though power can also be supplied via a direct drive, gears, etc. Thus, the power unit 24 can supply operational power to the driving wheels 26b through the transmission 44 in various manners, thereby rendering the mower 20 to be self-propelled. The transmission 44 can output the operational power as torque to the driven wheels 26b via an output shaft 48 or the like, which can be directly or indirectly coupled to the driven wheels 26b, such as by an additional gear transfer case or the like. In addition or alternatively, the transmission can also be operatively coupled to both wheels 26b via a through shaft 50, or even an auxiliary shaft, so as to drive both wheels 26b simultaneously. Still, a differential or the like (not shown) can also be utilized to permit the wheels 26b to operate at different rotational rates.

Figure 3:
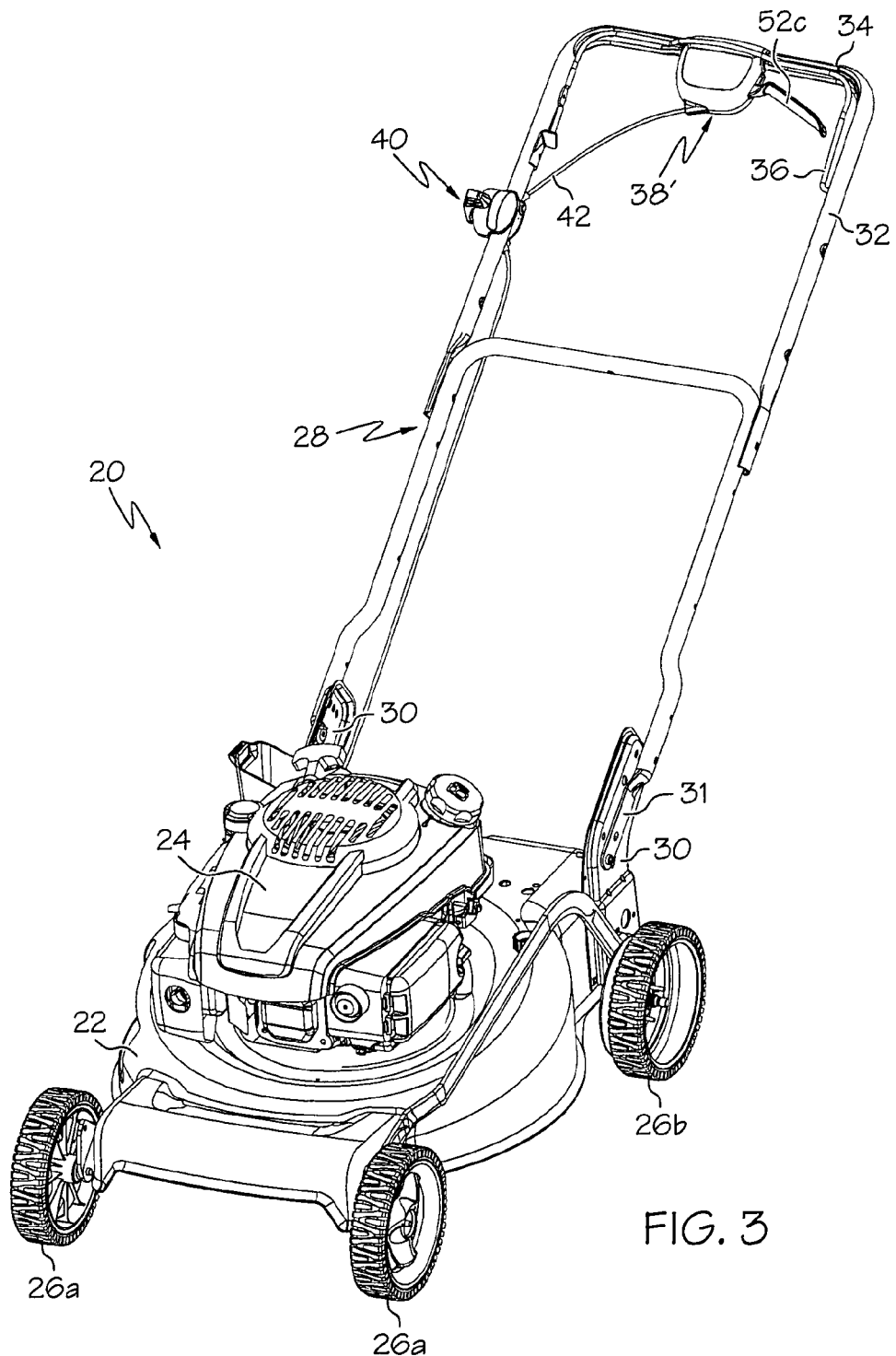
FIG. 3 is similar to FIG. 1, but illustrates another example operational trigger.

The transmission 44 can be selectively operated between a halt condition and an advancement condition via the operational trigger 38. For example, as shown, the operational trigger 38 can be coupled to the handle 28 generally adjacent the grip portion 34 and include one or more triggers 52a, 52b for selective operation by the hands of the operator. In such a placement, the operator can operate both of the operator presence bail 36 and the triggers 52a, 52b of the operational trigger 38 simultaneously. The operational trigger 38 can be operatively coupled to the transmission 44 by a cable 42, as shown, though can also be coupled via a solid link or the like. In one example, the cable 42 can be a cable movable within a flexible conduit, such as a steel-lined conduit, though various other cables can also be utilized. Thus, as will be discussed more fully herein, an operator can selectively operate the transmission 44 to place the mower 20 in an advancement condition by moving either or both of the triggers 52a, 52b to an engaged position, and alternatively, can place the mower 20 in a halt condition by releasing both of the triggers 52a, 52b to a disengaged position. Though the operational trigger 38 is illustrated in FIGS. 1-2 as having a pair of triggers 52a, 52b, it is to be understood that the operational trigger 38' can include only a single trigger 52c, as shown in FIG. 3, to control operation of the transmission.

The speed of the transmission 44, that is, the speed at which the mower 20 traverses the ground, can be adjusted variously. In the shown example, the output speed of the continuously variable transmission 44 can be controlled via the variable speed control apparatus 40. Specifically, where a cable 42 is used, the speed of the transmission 44 (and therefore the self-propelled speed of the mower 20) can be controlled via the relative position of the cable 42 and/or the relative tension in the cable. Thus, by varying the relative position and/or tension of the cable, an operator can selectively adjust the variable speed control apparatus 40 to adjust the output speed of the continuously variable transmission 44, and thus the driving speed of the wheels 26b. The variable speed control apparatus 40 can provide control of the transmission 44 over a continuous or substantially continuous range between a zero or low speed and a maximum or high speed.

Figure 4:
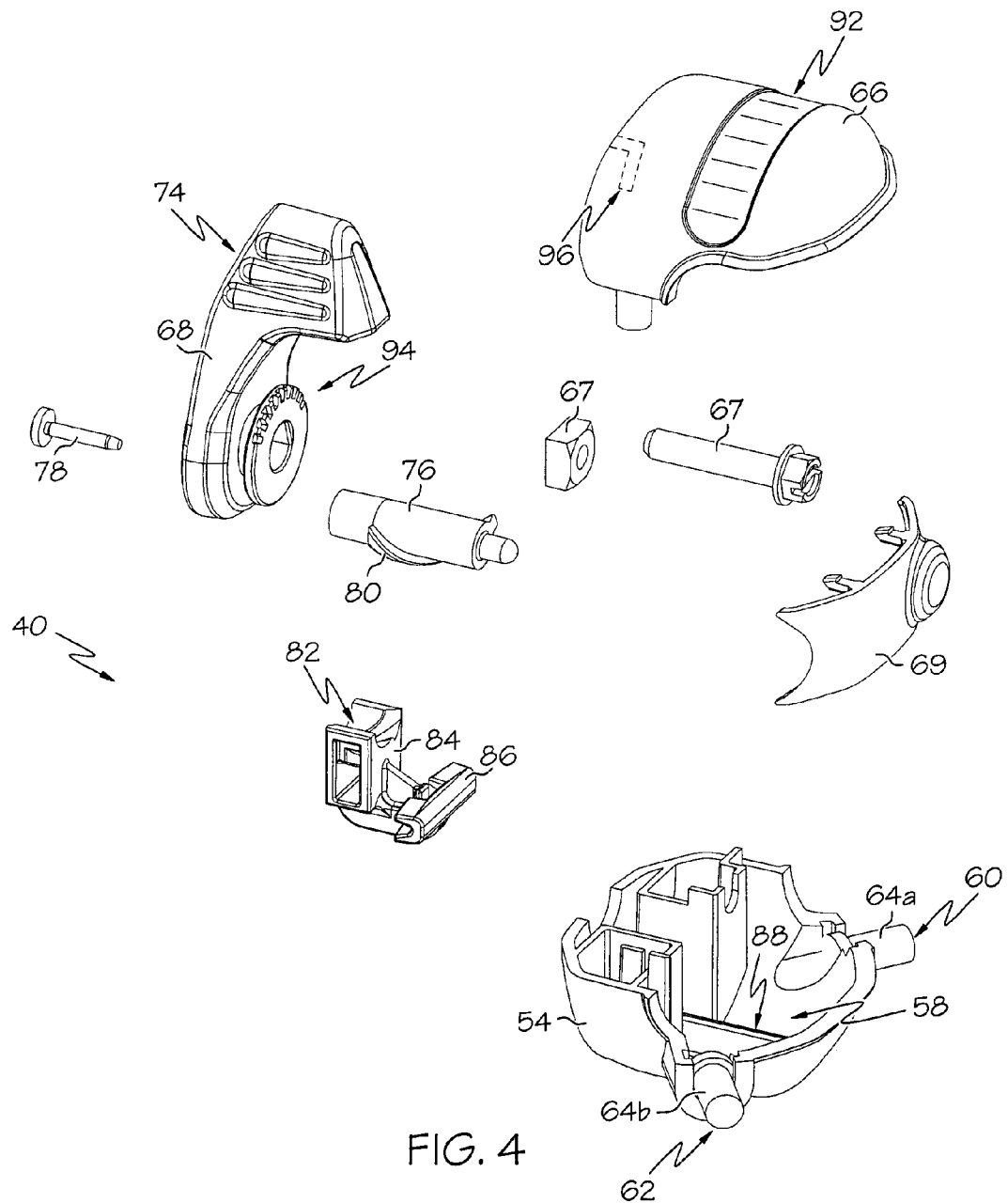
FIG. 4 illustrates an exploded, perspective view of an example variable speed control apparatus.

Turning now to FIG. 4, an example variable speed control apparatus 40 for controlling the relative position and/or tension of the cable 42 will be described. The variable speed control apparatus 40 can include a body 54 having an interior chamber 58. An intermediate portion 56 of the cable 42 (i.e., a portion located between the operational trigger 38 and the transmission 44, see FIGS. 5A-7B) can extend through the interior chamber 58 of the body 54. The body 54 can include first and second openings 60, 62 to permit the intermediate portion 56 of the cable 42 to enter and exit the body 54. In addition or alternatively, such as where the cable 42 is a cable movable within a flexible conduit, the first and second openings 60, 62 can include structure (such as keyed structure) for receiving and securing corresponding outer cable attachment structure 64a, 64b. In addition or alternatively, the body 54 can include a grommet, bushing, or the like (not shown) at the first and second openings 60, 62 to facilitate passage of the cable 42 therethrough. A cover 66 and/or side closure 69 can be coupled to the body 54 to enclose and at least partially define the interior chamber 58. Further, the elements of the variable speed control apparatus 40 can be removably or non-removably coupled together by adhesives, welding, and/or by various mechanical fasteners 67, such as screws, nuts, bolts, etc.

The variable speed control apparatus 40 can further include a control lever 68 pivotally coupled to the body 54 for pivotal movement between a first lever position 70 and a second lever position 72 (see FIGS. 5A-7B). The control lever 68 can be pivotally coupled to the body 54 in various manners, and may even be pivotally coupled to the cover 66. The control lever 68 can generally include a grip 74 disposed towards one end for use by an operator.

Further, a cable adjuster can be operatively coupled to the control lever 68 and can be adapted to translate rotational motion of the control lever 68 into generally linear motion. The cable adjuster can also be operatively coupled to the intermediate portion 56 of the cable 42 to selectively adjust the position and/or tension of the cable 42 for adjusting a self-propelled speed of the mower 20. In one example, the cable adjuster can include a rotatable driving member 76 that is operatively coupled to the control lever 68 in various manners. For example, the rotatable driving member 76 can be coupled to the control lever 68 via mechanical fasteners 78 or the like (e.g., screws, bolts, pins, etc.). In other examples (not shown) of mechanical fasteners, the rotatable driving member 76 can include snaps, clips, clasps, etc. that are coupled to the control lever 68, and/or the rotatable driving member 76 can even be formed with the control lever 68. Thus, the rotatable driving member 76 is rotatable relative to the body 54 upon pivotal movement of the control lever 68. In the shown example, the rotatable driving member 76 is generally rotatable in a 1:1 ratio relationship with the control lever 68, though it is to be understood that a gearing mechanism or the like (not shown) could also be utilized to vary the rotation ratio therebetween.

The rotatable driving member 76 can further include male screw structure 80 about an outer periphery thereof. As a result, pivoting motion of the control lever 68 causes rotation of the male screw structure 80 about the rotational axis of the rotatable driving member 76. The male screw structure 80 is generally engaged with corresponding female screw structure 82 of a cable tensioner 84 that is operatively coupled to the intermediate portion 56 of the cable 42. The cable tensioner 84 can include various structure for engagement with the intermediate portion 56 of the cable 42. In one example, the cable tensioner 84 can include a cable coupler 86 having a generally "C"-shaped geometry or a generally "U"-shaped geometry, though various other geometries are also contemplated. The generally "C"-shaped geometry and a generally "U"-shaped geometry of the cable coupler 86 can at least partially "wrap around" the intermediate portion 56 of the cable 42 (i.e., see FIGS. 5A-7B) to permit the cable tensioner 84 to selectively adjust the position and/or tension of the cable 42 via movement of the cable tensioner 84 relative to the body 54.

The cable tensioner 84 is adapted to move relative to the body 54, and is driven by the rotation of the rotatable driving member 76. The cable tensioner 84 can move in various manners. In one example, the cable tensioner 84 can be adapted to move along a generally linear path, such as a straight-line path, a curved path, a zig-zag path, a random path, or the like. Moreover, the path of travel of the cable tensioner 84 can be oriented variously relative to a longitudinal axis of the cable, such as a longitudinal axis of the intermediate portion 56 of the cable 42. In one example, as shown in FIGS. 5B, 6B, and 7B, the cable tensioner 84 can be adapted for linear movement along an axis oriented generally transverse (i.e., perpendicular) to a longitudinal axis of the cable 42. In addition or alternatively, the cable tensioner 84 can be guided via a guide path 88 coupled to or formed with the body 54. For example, the guide path 88 can include a projecting member and/or a recessed portion or the like.

Thus, pivoting motion of the control lever 68 causes rotational movement of the male screw structure 80 about the rotational axis of the rotatable driving member 76. Engagement of the rotating male screw structure 80 with the corresponding female screw structure 82 of the cable tensioner 84 drives the generally linear movement of the cable tensioner 84 relative to the control lever 68 and/or body 54. As a result, the cable tensioner 84 is generally movable between a first position (see FIGS. 5A-5B) to relatively decrease tension in the cable 42 (i.e., to adjust the intermediate portion 56 of the cable 42 to be relatively closer to the transmission 44), and a second position (see FIGS. 7A-7B) to relatively increase tension in the cable 42 (i.e., to adjust the intermediate portion 56 of the cable 42 to be relatively farther from the transmission 44).

Figure 5A:
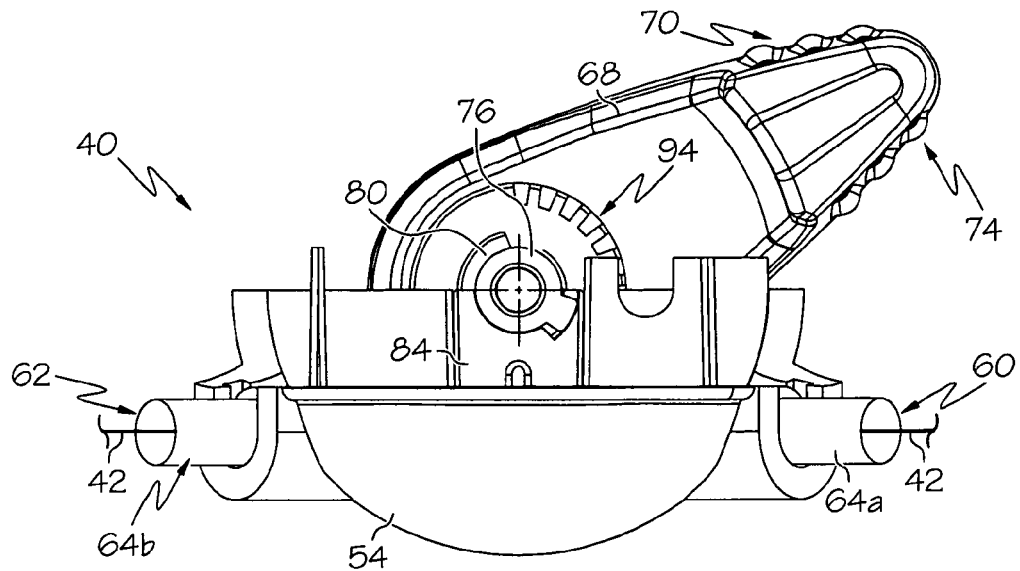
FIG. 5A illustrates a side view of the variable speed control apparatus of FIG. 4 in a first position.
Figure 5B:
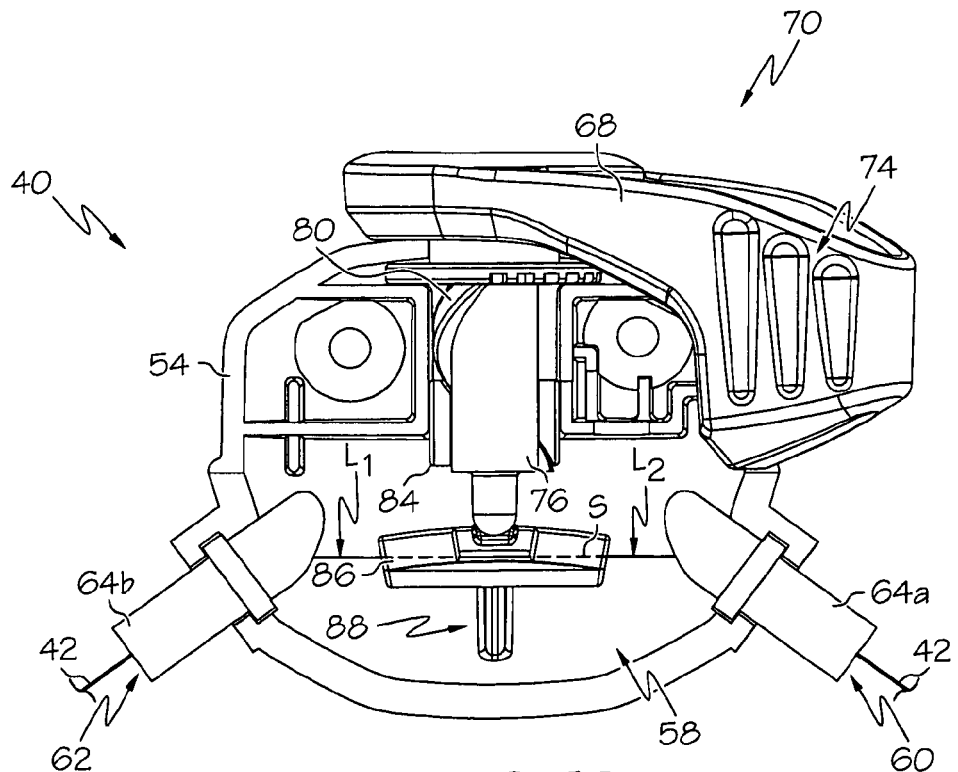
FIG. 5B is similar to FIG. 5A, but illustrates a top view.

Turning now to FIGS. 5A-7B, example operations of the cable adjuster will now be discussed. As shown in FIGS. 5A-5B, the control lever 68 is illustrated generally in the first lever position 70, while the cable tensioner 84 is similarly illustrated generally in the first position. The length of the cable 42 located within the interior chamber 58 of the body 54 is generally equal to the sum of lengths $L_1$, $L_2$, and S, wherein S denotes the length of cable 42 engaged by the cable coupler 86. The lengths $L_1$ and $L_2$ (and also $L_3$-$L_6$) can be measured variously, though for the purposes of this discussion, are intended to be bounded between the inner edge of the corresponding cable attachment structure 64a, 64b and the cable coupler 86. However, because the length S remains generally constant (or may change by a de minimis amount) with movement of the cable tensioner 84 between the first and second positions, the length S will cancel out in cable length comparisons and be generally ignored for purposes of this discussion. Thus, the length of the cable 42 located within the interior chamber 58 at the first position of FIGS. 5A-5B is generally equal to $(L_1+L_2)$.

Figure 6A:
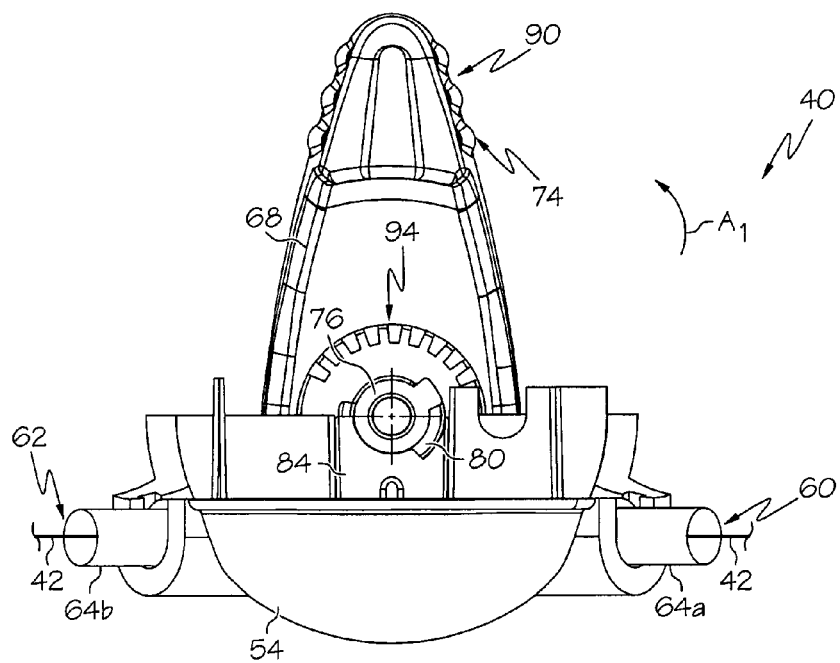
FIG. 6A illustrates a side view of the variable speed control apparatus of FIG. 4 in an intermediate position.
Figure 6B:
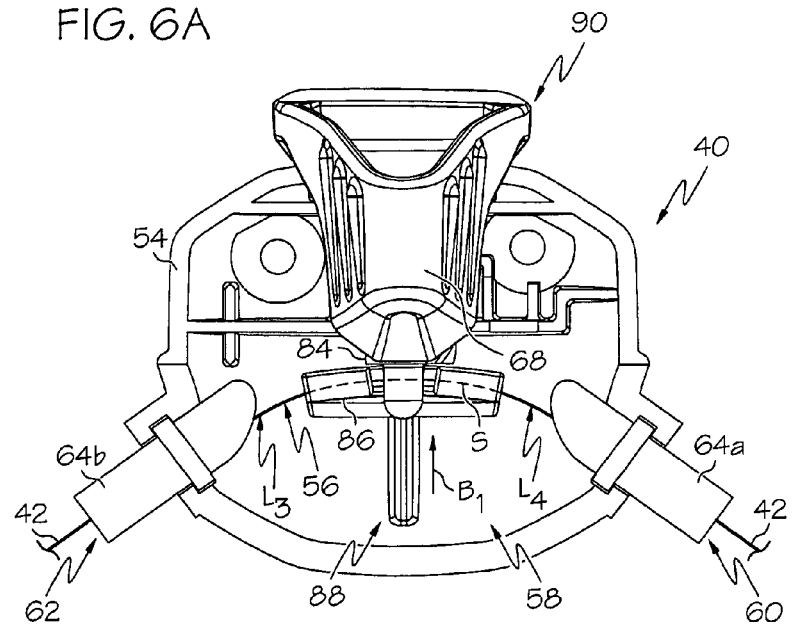
FIG. 6B is similar to FIG. 6A, but illustrates a top view.

Turning now to FIGS. 6A-6B, the control lever 68 is rotated a distance along the direction of arrow $A_1$ to an intermediate lever position 90 between the first and second positions 70, 72. Rotation of the control lever 68 causes rotation of the rotatable driving member 76, which in turn causes linear movement of the cable tensioner 84 along the direction of arrow $B_1$. As a result, a tension in the cable 42 is increased relative to that of the first lever position 70. Specifically, additional cable 42 is drawn into the interior chamber 58 via either or both of the first and second openings 60, 62, such that the length of cable 42 located within the interior chamber 58 at the intermediate position 90 is equal to $(L_3+L_4)$. Thus, the increase in cable length within the interior chamber 58 is generally equal to $(L_3+L_4)-(L_1+L_2)$. Because the ends of the cable 42 are either fixed or spring-coupled to the operational trigger 38 and/or the transmission 44, and the remainder of the cable 42 is not generally loose, the increase in cable length can cause the relative increase in tension in the cable 42. In another example, where one end of the cable 42 is generally fixed to the operational trigger 38 and resiliently-coupled (e.g., spring-coupled) to the transmission 44, the increase in cable length can be provided by adjusting the relative position of the intermediate portion 56 relative to the transmission 44. Specifically, as the control lever 68 is moved towards the intermediate position 90, the intermediate portion 56 of the cable 42 can be moved relatively farther from the transmission 44.

Figure 7A:
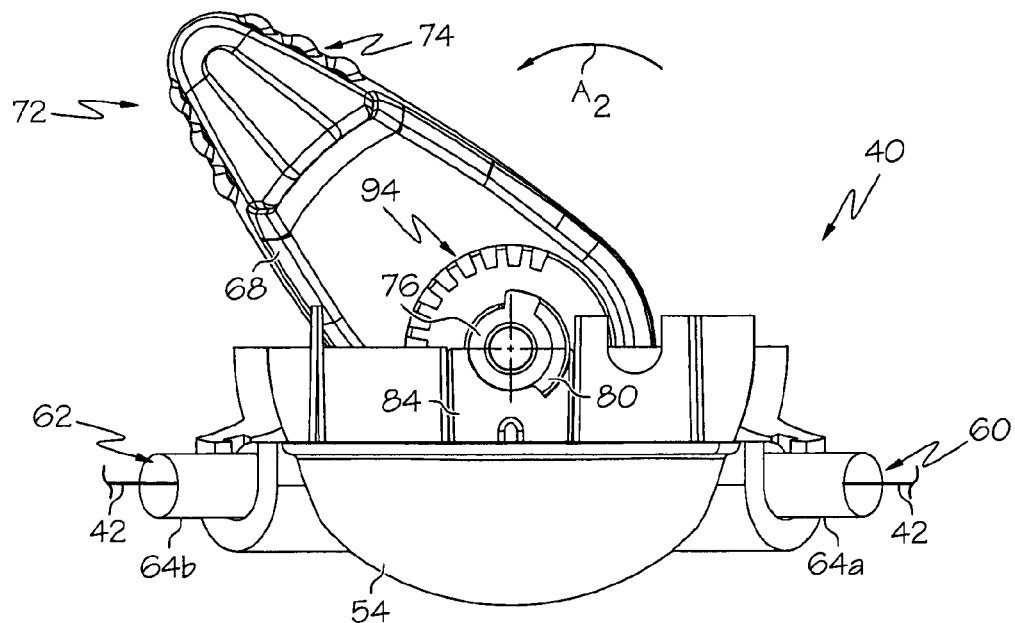
FIG. 7A illustrates a side view of the variable speed control apparatus of FIG. 4 in a second position.
Figure 7B:
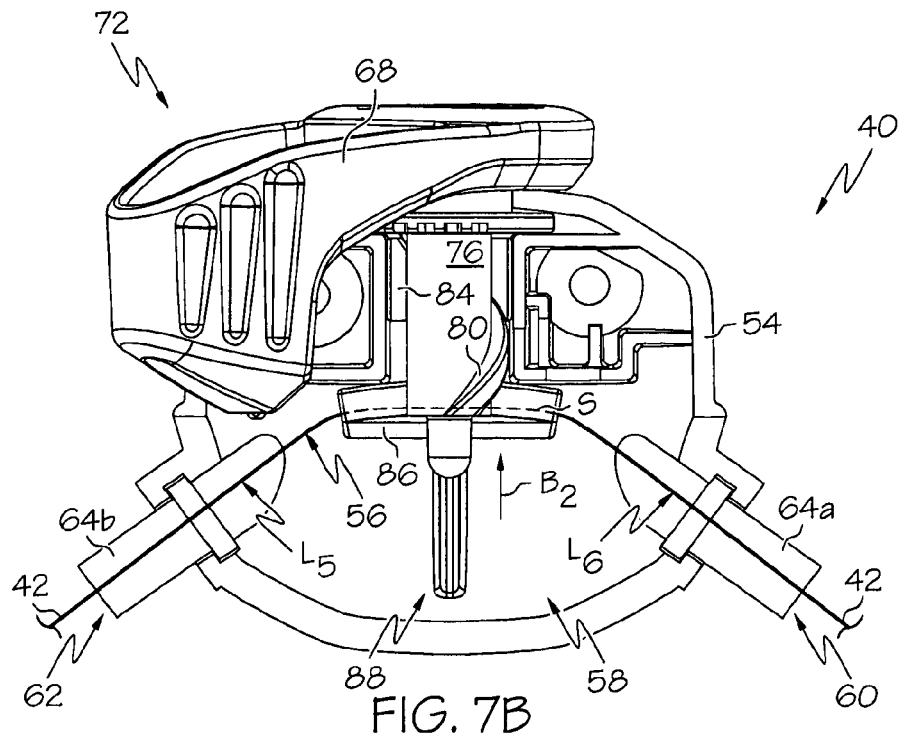
FIG. 7B is similar to FIG. 7A, but illustrates a top view.

Turning now to FIGS. 7A-7B, the control lever 68 is further rotated a distance along the direction of arrow $A_2$ to the second position 72. Rotation of the control lever 68 causes continued rotation of the rotatable driving member 76 to cause continued linear movement of the cable tensioner 84 along the direction of arrow $B_2$. As a result, a tension in the cable 42 is further increased relative to that of the intermediate lever position 90. Specifically, additional cable 42 is drawn into the interior chamber 58 via either or both of the first and second openings 60, 62, such that the length of cable 42 located within the interior chamber 58 at the second position 72 is equal to $(L_5+L_6)$. Thus, the increase in cable length within the interior chamber 58, relative to the first position 70, is generally equal to $(L_5+L_6)-(L_1+L_2)$. Thus, the increase in cable length can cause the relative increase in tension in the cable 42, and the intermediate portion 56 can be moved relatively farther from the transmission 44.

It is to be understood that the intermediate lever location 90 discussed herein is merely one example lever location between the first and second lever locations 70, 72. Indeed, the cable tensioner 84 can be adapted to provide infinite adjustability of the tension and/or relative positioning of the cable 42 within a range defined between the first tensioner position (FIGS. 5A-5B) and the second tensioner position (FIGS. 7A-7B). The range can also be otherwise defined, such as by the first and second lever positions 70, 72, by the length and/or geometry of the male or female screw structure 80, 82, and/or even by a mechanical stop provided to the various components of the variable speed control 40 discussed herein. Moreover, the structure described herein can also be configured to provide discrete adjustability of the cable tension and/or position among a plurality of predetermined values.

It is to be appreciated that the "screw-drive" example (i.e., male and female screw structure 80, 82) discussed herein is only intended to provide one example operation of the cable adjuster. Indeed, the cable adjuster can have various other configurations that are adapted to translate rotational motion of the control lever 68 into generally linear motion of the cable tensioner 84. For example, the cable adjuster can include various configurations, such as worm gears, rack and pinion gears, lead-screw assemblies, ball-screw assemblies, or the like.

In addition or alternatively, the variable speed control 40 can also include various other features. In one example, the cover 66 can include indicia 92 for indicating a self-propelled speed of the mower 20 based upon a position of the control lever 68 relative to the cover. The indicia 92 can include letters, numbers, and/or symbols, and can indicate a relative or an absolute speed of the mower 20.

In another example, the control lever 68 can include a sensory feedback element 94 for operative engagement with corresponding structure of the body 54 or the cover 66 to provide sensory feedback to an operator upon pivotal movement of the control lever 68 relative to the body 54. For example, the sensory feedback element 94 can include a plurality of recesses arranged in a pattern, such as an array. The plurality of recesses can be adapted to engage a resilient, flexible element 96 of the body 54 or cover 66, such as a cantilevered element or a spring-loaded element, to provide "clicking" sensory feedback that can be audible and/or tactile. The sensory feedback can facilitate speed selection by the operator. In addition or alternatively, the sensory feedback can also be adapted to provide the discrete adjustability of the cable tension and/or position among a plurality of predetermined values.

Figure 9:
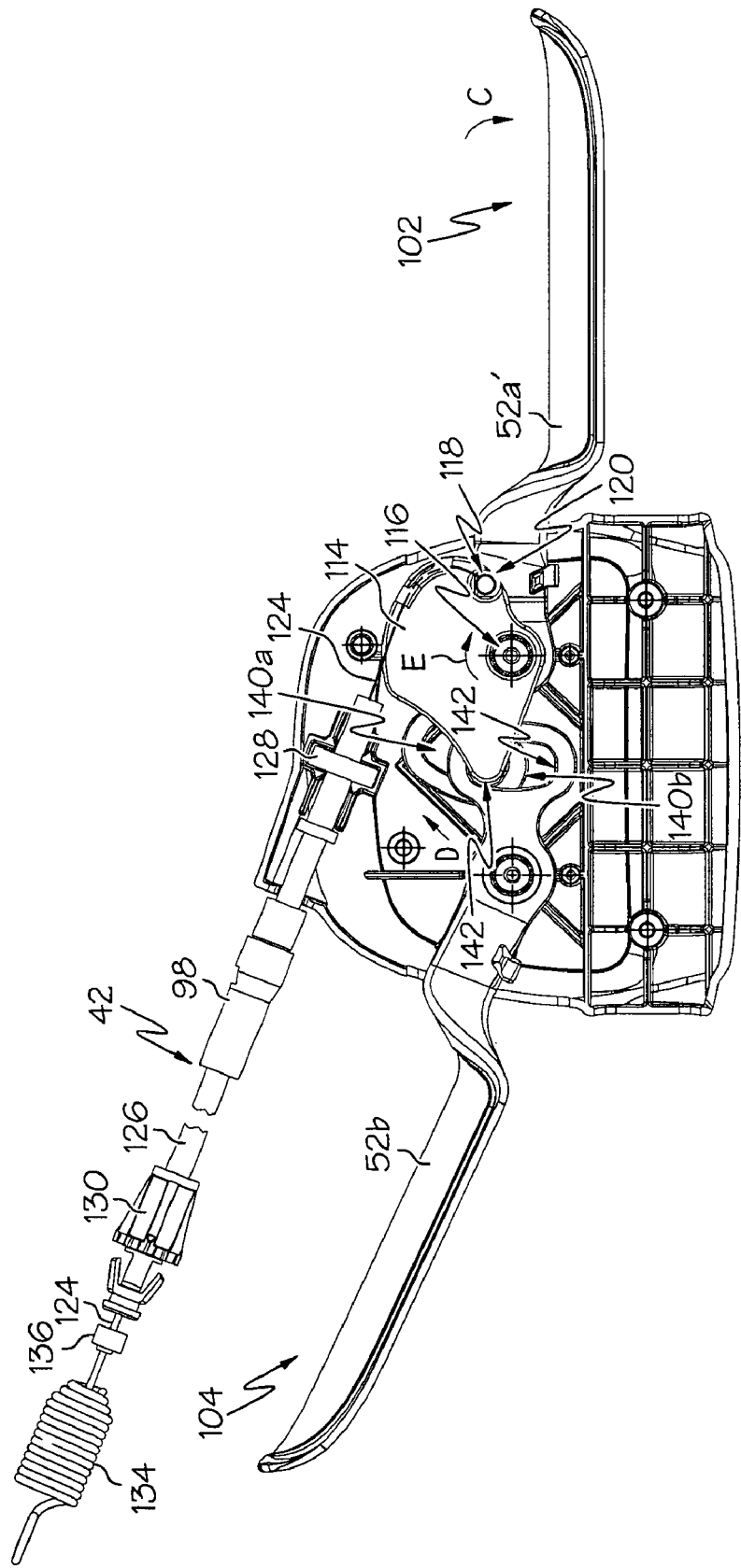
FIG. 9 is similar to FIG. 8, but shows one of the triggers in an engaged position.

In still yet another example, where the cable 42 is a cable movable within a flexible conduit, an auxiliary tension adjuster 98 can be provided to the cable 42. Generally, the cable can include a movable, flexible cable contained within a fixed outer casing. Thus, as shown in FIG. 9, the auxiliary tension adjuster 98 of the flexible conduit can be used to selectively increase or decrease the length of the fixed outer casing, thereby increasing or decreasing tension in the flexible cable contained therein. The auxiliary tension adjuster 98 can be utilized as a fine tension adjuster to provide further adjustment of the mower speed, and/or can be utilized to compensate for changes in cable tension over time. For example, the cable tension may decrease over time due to cyclic tension changes during use.

Figure 8:
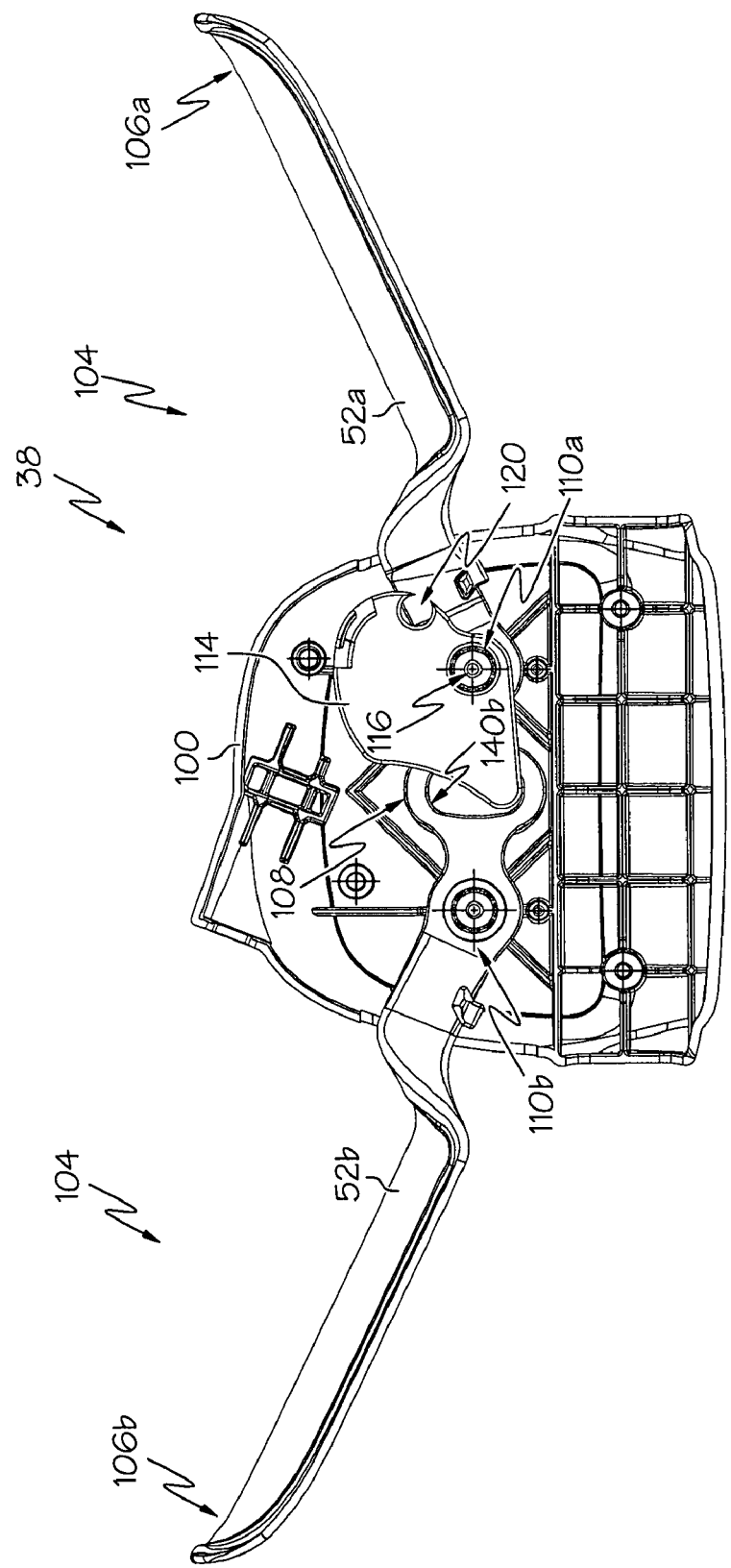
FIG. 8 illustrates a front view of an example operational trigger.
Figure 13:
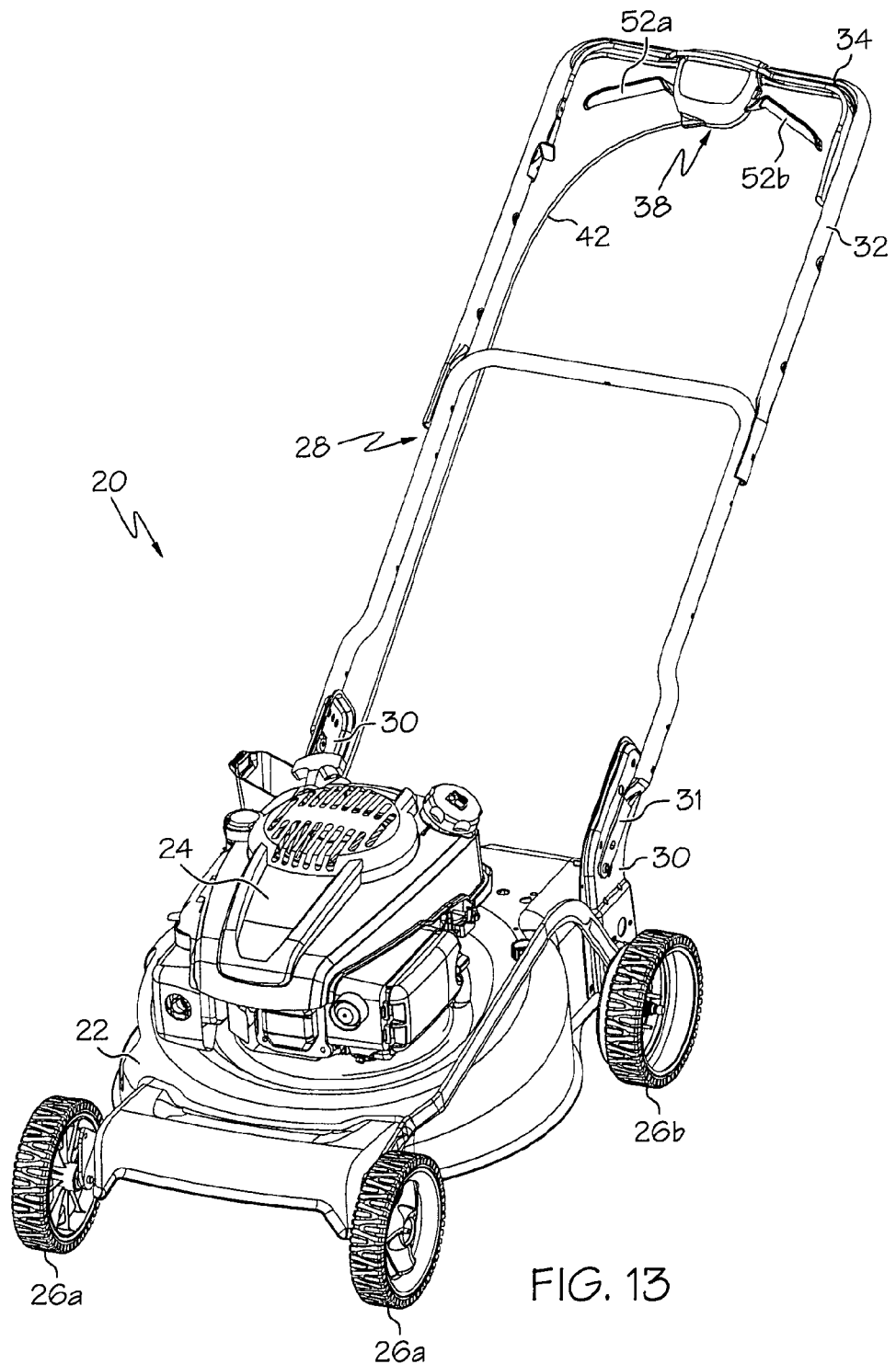
FIG. 13 illustrates a perspective view of a lawn mower that includes the operational trigger of FIG. 8 without a variable speed control apparatus.

Turning now to FIG. 8, the transmission 44 can be selectively operated between a halt condition and an advancement condition via the operational trigger 38. It is to be understood that the operational trigger 38 can be utilized with or without the variable speed control 40 discussed previously herein. For example, as shown in FIG. 13, where the transmission 44 is a single speed transmission, such as a non-adjustable transmission, the operational trigger 38 can selectively operate the transmission between the halt condition and the advancement condition at the single speed. Alternatively, when a variable speed control 40 is utilized, the operational trigger 38 can selectively operate the transmission 44 between the halt condition and the advancement condition at the speed selected via usage of the variable speed control 40. Still, it is to be appreciated that the operational trigger 38 can also be utilized in with a variable speed transmission that is selectively controlled by an apparatus other than the variable speed control 40 discussed herein.

The operational trigger 38, which can also be referred to as a trigger control system, is coupled to the handle 28 of the mower 20 (i.e., see FIG. 1), and can be located generally adjacent the grip portion 34 to facilitate use by an operator. The trigger control system 38 generally includes a housing 100 for containing the various components. It is to be understood that the housing 100 is illustrated in FIGS. 8-9 with a top cover removed for clarity. The trigger control system 38 can further include a plurality of independently operable triggers 52a, 52b rotatably coupled to the housing 100 for movement between an engaged position 102 and a disengaged position 104. As shown in FIG. 8, both triggers 52a, 52b are illustrated in the disengaged position 104, while in FIG. 9, one of the triggers 52a' is illustrated in the engaged position 102 rotated generally along the direction of arrow C.

Each trigger 52a, 52b can generally include a finger grip portion 106a, 106b located towards one end, and an operation member 108a, 108b located towards the opposite end. With reference to FIG. 1, the direction of arrow C is oriented generally towards the grip portion 34 of the handle 28 such that an operator can selectively operate the triggers 52a, 52b with his/her fingers via the finger grip portion 106a, 106b, while the remainder of his/her hand rests upon the grip portion 34 of the handle 28. Additionally, each of the triggers 52a, 52b can be rotatably coupled to the housing 100 in various manners. For example, as shown, the triggers 52a, 52b can be directly rotatably coupled to the housing 100, such as directly onto a shaft or the like, or indirectly, via bearings 110a, 110b, bushings, or the like. In addition or alternatively, a one or more biasing members 112a, 112b can be coupled to the triggers 52a, 52b to bias the triggers 52a, 52b towards the disengaged position 104. For example, as shown in FIG. 10, a plurality of biasing members 112a, 112b, such as springs or the like, can each be coupled to one of the plurality of triggers 52a, 52b for biasing a respective trigger 52a, 52b towards the disengaged position 104. As a result, the triggers 52a, 52b can be biased to return to the disengaged position 104 to operate the transmission 44 in the halt condition when released by the fingers of the operator.

The trigger control system 38 can further include a cam 114 rotatably coupled to the housing 100 about a cam rotation axis 116. The cam 114 can be rotatably coupled to the housing 100 in various manners, such as directly rotatably coupled to the housing 100 on a shaft or the like, or indirectly, via bearings, bushings, or the like. For example, as shown in FIGS. 8-10, the cam 114 can be rotatably coupled to the housing 100 such that the rotational axis 116 of the cam 114 is coaxial with the rotational axis of at least one of the triggers, such as trigger 52a. The cam 114 and trigger 52a can share a common shaft and/or bearing 110a, or even other structure. Moreover, the cam 114 can be independently rotatable relative to the housing 100 and either of the triggers 52a, 52b. Still, the cam 114 can also be coupled to one of the triggers 52a so as to be directly rotatable therewith.

As shown in FIG. 9, the cam 114 can also be operatively coupled to one end of the cable 42. Thus, rotation of the cam 114 in a first direction about the cam rotation axis 116 can relatively decrease the tension of the cable 42, while rotation in a second direction can relatively increase the tension of the cable 42. Similarly, rotation of the cam 114 in the first direction can adjust the position of the cable 42 to be relatively closer to the transmission 44, and while rotation in the second direction can adjust the position of the cable 42 to be relatively farther from the transmission 44. The cam 114 can be coupled to the cable 42 in various manners. In one example, the cable 42 can include an enlarged end 118 that is captured by corresponding structure of the cam 114, such as an aperture 120. In other example, the cable 42 can be coupled to the cam 114 by various mechanical fasteners, welding, adhesives, etc. In addition or alternatively, the cam 114 can also include cable guide structure 122, such as a recessed channel or the like, that extends about a portion thereof, such as an outer peripheral edge. The cable guide structure 122 can facilitate guiding, winding, and/or other movement of the cable 42 relative to the cam 114 upon rotational movement of the cam 114 so as to inhibit, such as prevent, binding of the cable 42. In addition or alternatively, the cam 114 can include strengthening structure 123, such as ribs or the like.

It is to be understood that, where the cable 42 is a cable movable within a flexible conduit, the cam 114 can generally be coupled to the movable, flexible cable 124 contained within a fixed outer casing 126 thereof. For example, as shown in FIG. 9, the fixed outer casing 126 can be coupled to the housing 100 by way of a T-nut 128 or other structure, retained by corresponding structure of the housing 100, so as to retain the outer casing 126 generally against translational movement, while permitting translational movement of the internal movable, flexible cable 124 due to rotation of the cam 114. Similarly, the cable movable within a flexible conduit can include fixture structure 130 at the opposite end that can also be coupled to a portion of the mower 20, such as a securement portion 132 of the transmission 44 (see FIG. 2). Moreover, as discussed previously herein, the other end of the movable, flexible cable 124 can be directly or indirectly coupled to the transmission 44, such as through a resilient member 134 (e.g., a spring). The cable movable within a flexible conduit can also include other structure, such as the previously discussed auxiliary tension adjuster 98 and/or protective caps 136 or the like. It is also be understood that the variable speed control 40 can be located variously about the cable 42, such as about a portion of the cable indicated by the broken section in FIG. 9.

The cam 114 can further include an actuation member 138 that is coupled to the cam 114 a distance from the cam rotation axis 116. For example, as shown, the actuation member 138 can include a projection or the like that extends away from the cam 114 along a direction generally parallel to the cam rotation axis 116. Moreover, because the actuation member 138 is spaced a distance from the cam rotation axis 116, a force applied to the actuation member 138 can cause movement thereof to thereby cause the cam 114 to rotate about the cam rotation axis 116. The actuation member 138 can be coupled to the cam 114 in various manners, such as by mechanical fasteners, adhesives, welding, etc, and/or can even be formed with the cam 114.

Turning back briefly to FIG. 10, each trigger 52a, 52b can include an operation member 108a, 108b for engagement with the actuation member 138 for causing rotation of the cam 114. The operation member 108a, 108b can include various structure and/or geometries for applying a force to the actuation member 138. In one example, the operation member 108a, 108b can include a projecting member, and/or a cup-shaped member having a "U"-shaped geometry or the like. In another example, any or all of the triggers 52a, 52b can include an aperture 140a, 140b extending partially or completely therethrough for at least partially receiving the actuation member 138. Usage of an aperture 140a, 140b can be beneficial to contain the actuation member 138 so as to inhibit, such as prevent, mechanical misalignment, binding, etc. The aperture 140a, 140b can include an internal surface 142 that at least partially defines the operation member 108a, 108b. For example, as shown, each of the triggers 52a, 52b can include an aperture 140a, 140b that extends therethrough, and has an internal surface 142 that defines the operation member 108a, 108b. Moreover, the apertures 140a, 140b can be generally aligned, and the actuation member 138 can extend at least partially through each of the apertures 140a, 140b. The actuation member 138 can be located adjacent the internal surface 142 of each of the apertures 140a, 140b. Thus, movement of the triggers 52a, 52b can cause engagement of the internal surface 142 with the actuation member 138 to apply a force thereto to cause rotational movement of the cam 114, whereby a tension of the cable 42 can be adjusted.

In other words, as shown in FIG. 9, movement of at least one of the triggers 52a' towards the engaged position 102 (i.e., along the direction of arrow C) can cause a respective operation member 108a, 108b of said trigger 52a' to move along the direction of arrow D (i.e., illustrated upwardly) to engage the actuation member 138 of the cam 114. Thus, the operation member 108a, 108b can impart a force to the actuation member 138 (i.e., along the direction of arrow D) to rotate the cam 114 about the cam rotation axis 116 in the second direction (i.e., along the direction of arrow E). As a result, the rotation of the cam 114 in the second direction can relatively increase tension in the cable 42, due to the moveable, flexible cable 124 being pulled and extended by rotation of the cam 114, whereby the transmission 44 is operated in the advancement condition. Conversely, when the trigger 52a' is released by the operator, the biasing members 112a, 112b can cause the trigger 52a' to rotate back in the opposite direction, whereupon the force applied by the operation member 108a, 108b will be reduced and/or released upon the actuation member 138 to permit the cam 114 to rotate back towards the first direction. The tension in the cable 42 will relatively decrease, and the transmission 44 will be operated in the halt condition. It is to be similarly understood that rotation of the cam 114 in the first direction (i.e., the disengaged position 104 of the triggers 52a, 52b) can relatively adjust the position of the cable 42 towards the transmission 44 to operate in the halt condition, while rotation of the cam 114 in the second direction (i.e., the engaged position 102 of the triggers 52a', 52b') can relatively adjust the position of the cable 42 away from the transmission 44 to operate in the advancement condition.

Turning now to FIGS. 12A-12C, and as discussed previously, the actuation member 138 can extend at least partially through each of the apertures 140a, 140b of all of the plurality of triggers 52a, 52b. Thus, it can be beneficial to have at least one of the apertures 140b of a selected one of the triggers 52b be of a size sufficient to permit the actuation member 138 to move freely within the aperture 140b while another of the triggers 52a is moved towards the engaged position 102. In other words, if the aperture 140b of the trigger 52b a size sufficient to permit the actuation member 138 to move freely therein, that trigger 52b can remain generally stationary while the other triggers 52a is moved towards the engaged position 102.

For example, as shown in FIG. 12A, the trigger control system 38 is illustrated with both of the triggers 52a, 52b in the disengaged position 104. The triggers 52a, 52b are located relative to each other such that the ends containing the operation members 108a, 108b are adjacent such that the apertures 140a, 140b thereof are generally aligned. The actuation member 138 of the cam 114 extends through each of the apertures 140a, 140b. The actuation member 138 is positioned generally towards a bottom portion of the apertures (i.e., adjacent the lower internal surface 142 of the apertures 140a, 140b) while both of the triggers 52a, 52b are in the disengaged position 104. Moreover, each of the apertures 140a, 140b extends a distance generally upwardly, relative to the internal surface 142. For example, as shown, each of the apertures 140a, 140b can include a generally curved geometry, such as an oval geometry. Still, the apertures 140a, 140b can have various geometries, such as circular, elliptical, rectangular, square, triangular, another polygonal shape, or even random.

Next, as shown in FIG. 12B, one of the triggers 52a' is illustrated in the engaged position 102 rotated generally along the direction of arrow C. The operation member 108b of said trigger 52a' similarly moves along the direction of arrow D (i.e., illustrated upwardly) to engage the actuation member 138 of the cam 114 to rotate the cam 114 about the cam rotation axis 116 in the second direction (i.e., along the direction of arrow E). As a result, the rotation of the cam 114 in the second direction can relatively increase tension in the cable 42. However, because the aperture 140b of the other trigger 52b has a size sufficient to permit the actuation member 138 to move freely therein, the other trigger 52b can remain in the disengaged position 104. In other words, as can be seen in FIG. 12B, the aperture 140b can have a size sufficient to permit the actuation member 138 to move freely therein while imparting zero, or substantially zero, force upon the other trigger 52b. In the shown example, the aperture 140b of the trigger 52b has a size sufficient to accommodate at least the vertical travel of the actuation member 138 when the trigger 52a' is moved to the fully engaged position 102.

Furthermore, where the apertures 140a, 140b of both of the triggers 52a, 52b are sufficiently large, and/or may even have substantially the same geometry, such as shown in FIGS. 12A-12C, either of the triggers 52a, 52b can be independently moved between the engaged and disengaged positions 102, 104 without requiring movement of the other trigger 52a, 52b. Indeed, as shown in FIG. 12C, both of the triggers 52a', 52b' can be moved to the engaged position 102 (along the direction of arrows C, C') to control operation of the transmission 44. Thus, an operator is provided the flexibility to control operation of the transmission 44 via either, or both, of the triggers 52a, 52b of the trigger control system 38.

In addition or alternatively, each of the triggers 52a, 52b can be configured to provide differing amounts of rotation of the cam 114, such as via differences in the geometries of the apertures 140a, 140b. For example, one of the triggers can cause rotation of the cam 114 within a first range, while another of the triggers can cause rotation of the cam 114 within a second range, where the second range is different (i.e., greater or smaller) than the first range. Still, any or all of the apertures 140a, 140b can also be designed to permit or require movement of one trigger in response to movement of another trigger.

In addition or alternatively, a selected one of the triggers, such as a trigger 52b having a rotational axis that is coaxial with the rotational axis 116 of the cam 114 (see FIGS. 12A-12C), can be adapted to be rotatably coupled to the cam 114 so as to rotate therewith. In other words, rotation of the trigger 52b between the engaged and disengaged positions 102, 104 can directly cause rotation of the cam 114 without engagement of the associated operation member 108a, 108b and actuation member 138. However, another of the triggers, such as trigger 52a, can still have an operation member 108a, 108b (i.e., an aperture 140a, 140b having an internal surface 142) for selective engagement with the actuation member 138 of the cam 114 (i.e., the aperture 140a, 140b having a size sufficient to permit the actuation member 138 to move freely therein). Thus, the cam 114 can be selectively operable by either of the triggers 52a, 52b. However, while the rotatably coupled trigger 52b can be operated independently, operation of the other trigger 52a would be dependent upon operation of the rotatably coupled trigger 52b. Still, such a configuration can also provide flexibility to the operator.

Although a lawn mower has been described herein as a walk-behind, self-propelled mower 20, the subject application is not limited to the lawn mower and can be applied to various kinds of working machines such as other grass cutting machines, cultivators, snow removal machines, and/or various other self-propelled machines.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A self-propelled mowing machine, including:
    a chassis;
    a power unit;
    a handle coupled to the chassis, including a grip portion;
    a driving wheel rotatably coupled to the chassis;
    a transmission for propelling the mowing machine, interposed between the power unit and the driving wheel;
    a cable having a first end and a second end, the first end being coupled to the transmission, whereby operation of the transmission is controlled via the cable; and
    a trigger control system coupled to the handle adjacent the grip portion for operating the transmission between a halt condition and an advancement condition, including:
        a housing;
        a plurality of independently operable triggers rotatably coupled to the housing for movement between an engaged position and a disengaged position, each trigger including an operation member;
        a cam rotatably coupled to the housing about a cam rotation axis and operatively coupled to the second end of the cable, wherein rotation of the cam in a first direction about the cam rotation axis relatively decreases tension in the cable and rotation of the cam in a second direction about the cam rotation axis relatively increases tension in the cable; and
        an actuation member coupled to the cam a distance from the cam rotation axis,
        wherein movement of at least one of the plurality of triggers towards the engaged position causes a respective operation member of said trigger to engage the actuation member to rotate the cam in the second direction, whereby the transmission is operated in the advancement condition, and
        wherein the actuation member extends to contact an engagement surface of the operation member of each of the plurality of triggers, the engagement surfaces of each of the operation members being generally aligned.

2. The self-propelled mowing machine of claim 1, wherein each trigger includes an aperture having an internal surface that at least partially defines the operation member, the internal surface corresponding to the engagement surface.

3. The self-propelled mowing machine of claim 2, wherein the actuation member extends through the apertures of all of the plurality of triggers.

4. The self-propelled mowing machine of claim 3, wherein an aperture of a selected one of the plurality of triggers includes a size sufficient to permit the actuation member to move freely therein to maintain said selected one of the plurality of triggers generally stationary when another of the plurality of triggers is moved towards the engaged position.

5. The self-propelled mowing machine of claim 1, further including a plurality of biasing members each coupled to one of the plurality of triggers for biasing a respective trigger towards the disengaged position.

6. The self-propelled mowing machine of claim 1, wherein the cable is a cable movable within a flexible conduit.

7. The self-propelled mowing machine of claim 1, wherein the transmission is a variable speed transmission.

8. The self-propelled mowing machine of claim 7, further including a variable speed control apparatus for further adjusting a relative tension in the cable, whereby a self-propelled speed of the mowing machine is controlled via the relative tension in the cable.

9. The self-propelled mowing machine of claim 1, wherein a rotational axis of the cam is coaxial with a rotational axis of at least one of the plurality of triggers.

10. A self-propelled mowing machine, including:
a chassis;
a power unit;
a handle coupled to the chassis, including a grip portion;
a driving wheel rotatably coupled to the chassis;
a transmission for propelling the mowing machine, interposed between the power unit and the driving wheel;
a cable having a first end and a second end, the first end being coupled to the transmission, whereby operation of the transmission is controlled via the cable; and
a trigger control system coupled to the handle adjacent the grip portion for operating the transmission between a halt condition and an advancement condition, including:
a housing;
a plurality of independently operable triggers rotatably coupled to the housing for movement between an engaged position and a disengaged position, a first trigger of the plurality of triggers including an operation member;
a cam rotatably coupled to the housing about a cam rotation axis and operatively coupled to the second end of the cable, wherein rotation of the cam in a first direction about the cam rotation axis relatively decreases tension in the cable and rotation of the cam in a second direction about the cam rotation axis relatively increases tension in the cable; and
an actuation member coupled to the cam a distance from the cam rotation axis,
wherein movement of at least one of the first trigger towards the engaged position causes a respective operation member of said first trigger to engage the actuation member to rotate the cam in the second direction, whereby the transmission is operated in the advancement condition, and
wherein the actuation member extends to contact an engagement surface of each of the plurality of triggers, the engagement surfaces of each of the triggers being generally aligned.

11. The self-propelled mowing machine of claim 10, wherein a second trigger of the plurality of triggers has a rotational axis that is coaxial with the cam rotational axis and is rotatably coupled to the cam to rotate together therewith.

12. The self-propelled mowing machine of claim 11, wherein the first trigger includes an aperture having an internal surface that at least partially defines the operation member, and wherein the aperture includes a size sufficient to permit the actuation member to move freely therein to maintain the first trigger generally stationary when the second trigger is moved towards the engaged position.

13. The self-propelled mowing machine of claim 10, wherein each of the plurality of triggers includes an operation member and an aperture having an internal surface that at least partially defines the operation member, and wherein the actuation member extends through the apertures of all of the plurality of triggers.

14. The self-propelled mowing machine of claim 13, wherein an aperture of the first trigger includes a size sufficient to permit the actuation member to move freely therein to maintain the first trigger generally stationary when a second trigger of the plurality of triggers is moved towards the engaged position.

15. The self-propelled mowing machine of claim 10, further including a plurality of biasing members each coupled to one of the plurality of triggers for biasing a respective trigger towards the disengaged position.

16. The self-propelled mowing machine of claim 10, wherein the transmission is a variable speed transmission, and wherein the self-propelled mowing machine further includes a variable speed control apparatus for further adjusting a relative position the cable, a whereby a self-propelled speed of the mowing machine is controlled via the relative position of the cable.

17. A trigger control apparatus for operating a transmission of a self-propelled mowing machine via a cable between a halt condition and an advancement condition, including:
a housing;
a plurality of independently operable triggers rotatably coupled to the housing for movement between an engaged position and a disengaged position, each trigger including an operation member;
a cam rotatably coupled to the housing about a cam rotation axis and operatively coupled to the cable, wherein rotation of the cam in a first direction about the cam rotation axis relatively decreases tension in the cable and rotation of the cam in a second direction about the cam rotation axis relatively increases tension in the cable; and
an actuation member coupled to the cam a distance from the cam rotation axis;
wherein movement of at least one of the plurality of triggers towards the engaged position causes a respective operation member of said trigger to engage the actuation member to rotate the cam in the second direction, whereby the transmission is operated in the advancement condition, and
wherein the actuation member extends to contact an engagement surface of the operation member of each of the plurality of triggers, the engagement surfaces of each of the operation members being generally aligned.

18. The self-propelled mowing machine of claim 17, wherein each trigger includes an aperture having an internal surface that at least partially defines the operation member, the internal surface corresponding to the engagement surface of each trigger, and wherein the actuation member extends through the apertures of all of the plurality of triggers.

19. The self-propelled mowing machine of claim 18, wherein an aperture of one of the plurality of triggers includes a size sufficient to permit the actuation member to move freely therein to maintain said one of the plurality of triggers generally stationary when another of the plurality of triggers is moved towards the engaged position.

20. The self-propelled mowing machine of claim 17, further including a plurality of biasing members each coupled to one of the plurality of triggers for biasing a respective trigger towards the disengaged position.

21. A trigger control apparatus for operating a transmission of a self-propelled mowing machine via a cable between a halt condition and an advancement condition, including:
   a housing;
   a plurality of independently operable triggers rotatably coupled to the housing for movement between an engaged position and a disengaged position, a first trigger of the plurality of triggers including an operation member;
   a cam rotatably coupled to the housing about a cam rotation axis and operatively coupled to the cable, wherein rotation of the cam in a first direction about the cam rotation axis relatively decreases tension in the cable and rotation of the cam in a second direction about the cam rotation axis relatively increases tension in the cable; and
   an actuation member coupled to the cam a distance from the cam rotation axis;
   wherein movement of the first trigger towards the engaged position causes a respective operation member of said first trigger to engage the actuation member to rotate the cam in the second direction, whereby the transmission is operated in the advancement condition, and
   wherein the actuation member extends to contact an engagement surface of each of the plurality of triggers, the engagement surfaces of each of the operation members being generally aligned.

22. The self-propelled mowing machine of claim 21, wherein a second trigger of the plurality of triggers has a rotational axis that is coaxial with the cam rotational axis and is rotatably coupled to the cam to rotate together therewith.

23. The self-propelled mowing machine of claim 21, wherein each of the plurality of triggers includes an operational member and an aperture having an internal surface that at least partially defines the operation member, the internal surface corresponding to the engagement surface, and wherein the actuation member extends through the apertures of all of the plurality of triggers.

24. The self-propelled mowing machine of claim 21, further including a plurality of biasing members each coupled to one of the plurality of triggers for biasing a respective trigger towards the disengaged position.

* * * * *